United States Patent
Kitajima (10) Patent No.: US 6,655,619 B2
(45) Date of Patent: Dec. 2, 2003

(54) SPINNING-REEL RECIPROCATING MECHANISM

(75) Inventor: Keigo Kitajima, Sakai (JP)

(73) Assignee: Shimano Inc., Osaka (JP)

(*) Notice: Subject to any disclaimer, the term of this patent is extended or adjusted under 35 U.S.C. 154(b) by 0 days.

(21) Appl. No.: 10/225,307

(22) Filed: Aug. 22, 2002

(65) Prior Publication Data

US 2003/0047633 A1 Mar. 13, 2003

(30) Foreign Application Priority Data

Sep. 12, 2001 (JP) .......................... 2001-276216

(51) Int. Cl.⁷ ............................................... A01K 89/01
(52) U.S. Cl. ........................................ 242/241; 242/242
(58) Field of Search ................................ 242/241, 242, 242/277, 278, 279

(56) References Cited

U.S. PATENT DOCUMENTS

| | | | | |
|---|---|---|---|---|
| 4,491,285 A | * | 1/1985 | Councilman | 242/242 |
| 5,564,639 A | * | 10/1996 | Yamaguchi | 242/241 |
| 5,678,780 A | * | 10/1997 | Hitomi | 242/241 |
| 5,788,173 A | * | 8/1998 | Kawabe | 242/311 |
| 5,890,668 A | * | 4/1999 | Hitomi | 242/241 |
| 5,984,220 A | * | 11/1999 | Kawabe | 242/241 |
| 6,484,956 B2 | * | 11/2002 | Kawabe et al. | 242/278 |

FOREIGN PATENT DOCUMENTS

| | | |
|---|---|---|
| EP | 0 839 445 A1 | 5/1998 |
| JP | 2000-316431 A | 11/2000 |

* cited by examiner

Primary Examiner—Kathy Matecki
Assistant Examiner—Evan Langdon
(74) Attorney, Agent, or Firm—Shinjyu Global IP Counselors, LLP (57) ABSTRACT

Reciprocating mechanism for a spinning-reel, which reciprocates the spool in response to rotation of the rotor, has a worm, a slider, an intermediate gear, a first guide shaft, and a second guide shaft. Crisscrossing helical grooves are formed in the outer circumference of worm, which is rotatively supported by the reel unit. Slider, which is coupled to the spool, has an engagement pin that engages helical grooves, and a slider body that has a mounting hole that pivotably supports engagement pin such that engagement pin engages helical grooves from radial outside of worm. Intermediate gear transmits rotation of rotor to worm. First and second guide shafts guide slider in the direction of spool shaft. First guide shaft is disposed on a side of engagement member opposite the side closer to worm. With the present invention, it is possible to reduce the size of reciprocating mechanism.

16 Claims, 5 Drawing Sheets

SPINNING-REEL RECIPROCATING MECHANISM

BACKGROUND OF THE INVENTION

1. Field of the Invention

This invention generally relates to reciprocating mechanisms. More specifically, the present invention relates to spinning-reel reciprocating mechanisms for, in response to rotation of the rotor, reciprocating a spool that is mounted in a reel unit of the spinning reel such that the spool is shiftable front and rear.

2. Background Information

A spinning reel in general has a reel unit, a rotor rotatably supported by the reel unit, and a spool outer-circumferentially around which fishing line winds. The rotor includes a pair of arm portions, and in between the two arm portions is provided with a bail that can be shifted between line-guiding and line-releasing postures. Further, a line roller for guiding fishing line to be wound onto an outer periphery of the spool during line retrieval is provided at the fore end of one of the arm portions.

Spinning reels of this sort are provided with an oscillating mechanism (one example of a reciprocating mechanism) for winding fishing line that is guided by a bail and a line roller onto the outer periphery of the spool uniformly in the front-to-rear direction. The oscillating mechanism is installed in the interior of the reel unit, and includes: a worm disposed in parallel with a spool shaft onto which the spool is fitted; a transmission mechanism for rotating the worm in response to rotation of the rotor; a slider that engages the worm, and two guide shafts that guide the slider in the front and rear directions.

Crisscrossing helically-shaped grooves are formed on the circumferential periphery of the worm. The transmission mechanism includes an intermediate gear fixed to the worm. The intermediate gear meshes with a pinion gear that rotates the rotor in response to cranking of the handle. The pinion gear meshes with a face gear furnished on the handle shaft, and rotates through rotation of the handle. The slider is fitted onto the rear end of the spool shaft. An engagement pin that engages the helical grooves is detachably and reattachably mounted on the slider so as to be pivotable about its shaft. The engagement pin ordinarily is disposed horizontally paralleling the diametric direction of the worm, with the fore end of the engagement pin being oriented toward the worm. The two guide shafts are disposed astride above and below the worm.

Due to the engagement pin in the oscillating mechanism engaging the helical grooves on the worm that rotates in response to rotation of the handle, the slider is guided on the two guide shafts and reciprocates along the worm. Via the slider's reciprocating along the worm, the spool shaft and the spool also reciprocate likewise. By the spool being reciprocated synchronously with the rotor in response to rotating operation of the handle, fishing line is wound uniformly onto the outer circumference of the spool.

Recently, there has been a need to reduce the size of reel unit for spinning reels having thus-configured oscillating mechanism. In order to reduce the size of the reel unit, the oscillating mechanism installed in the reel unit interior must be correspondingly reduced in size. Nevertheless, since the two guide shafts in conventional oscillating mechanisms are disposed astride above and below the worm, a space for accommodating the guide shaft has to be secured beneath the worm. Accordingly, it has been difficult to reduce the size of the reel unit.

In view of the above, there exists a need for a spinning-reel reciprocating mechanism which overcomes the above mentioned problems in the prior art. This invention addresses this need in the prior art as well as other needs, which will become apparent to those skilled in the art from this disclosure.

SUMMARY OF THE INVENTION

An object of the present invention is to allow reduction of size of the reel unit of a spinning reel that has a reciprocating mechanism.

A spinning-reel reciprocating mechanism according to a first aspect of the invention is a mechanism that, in response to rotation of the rotor, reciprocates a spool that is mounted on a reel unit of the spinning-reel so as to be shiftable in a front-rear direction, and is furnished with a worm, a sliding member, a rotation-transmitting part, a first guide shaft member, and a second guide member. The worm, which is a shaft rotatably supported by the reel unit, is disposed diagonally beneath and paralleling a spool shaft coupled to the spool. Crisscrossing helical grooves are formed on the circumferential periphery of the worm. The sliding member, which is a component coupled to the spool shaft immovably in at least its axial direction, has an engagement member that engages the helical grooves, and a mounting portion that rotatably supports the engagement member extending from the radial outer side of the worm toward the helical grooves, such that the engagement member engages the helical grooves. The rotation-transmitting part is for transmitting rotation of the rotor to the worm. The first guide member is disposed on a side of the engagement member opposite the side closer to the worm. The first guide member guides the sliding member in the direction of the spool shaft. The second guide member is disposed above the worm, and guides the sliding member in the direction of the spool shaft.

In this spinning-reel reciprocating mechanism, when the rotor rotates in response to cranking of the handle, the rotation is transmitted via the rotation-transmitting part to the worm. Accordingly, the worm rotates. Then, the sliding member, guided on the first and second guide members by the engagement member being engaged with the worm, reciprocates back and forth, thereby reciprocating the spool back and forth and winding the fishing line uniformly onto the spool. Herein, the worm is disposed diagonally beneath the spool shaft, while the first guide member is disposed on the side of the engagement member opposite the side closer to the worm. Accordingly, there is no need for a space beneath the worm to accommodate the guide member. As a result, it is possible to reduce the size of the reel unit.

The reciprocating mechanism according to a second aspect of the invention is the mechanism set forth in the first aspect, wherein the sliding member includes an opposing portion that opposes a portion of the outer circumference of the worm. In this case, rather than covering the entire periphery of the worm, the sliding member guided by the guide members is furnished with just the opposing portion, so that the sliding member may be reduced in size and the reel unit can be made even smaller.

A spinning-reel reciprocating mechanism according to a third aspect of the invention is the mechanism set forth in either the first or second aspects, wherein the rotation-transmitting part has an intermediate gear. The intermediate gear is fitted immovably to the worm and meshes with a pinion gear for rotating the rotor in response to cranking of the handle. In this case, since the intermediate gear is made diametrically larger to make the space between the spool shaft and the worm larger, it is possible to bring the engagement member closer toward the worm. This leaves a leeway spatially on the side of the engagement member opposite the side closer to the worm, which makes it possible to make the reel unit even smaller.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Overall Configuration

Figure 1:
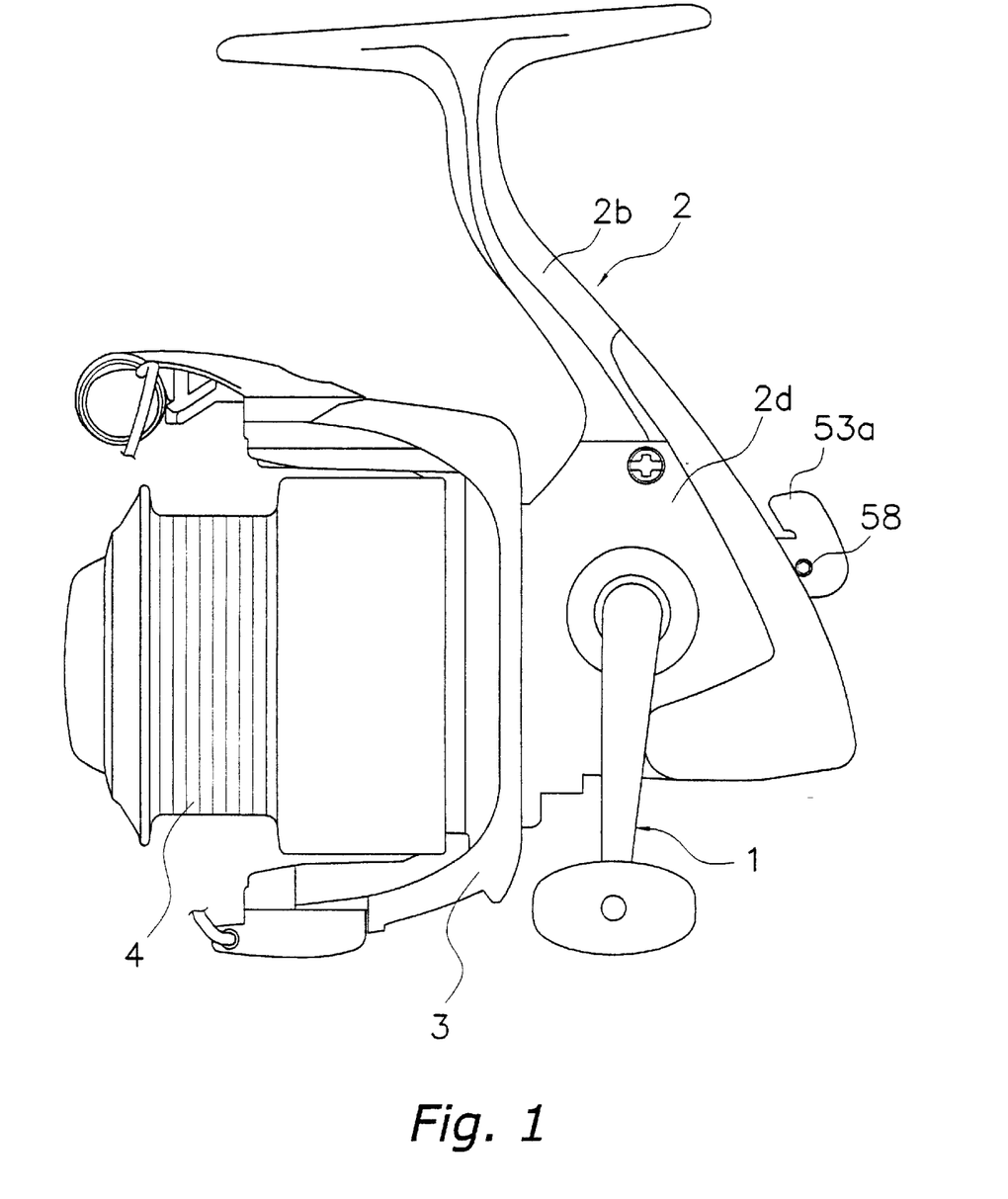
FIG. 1 is a left-side view of a spinning reel in accordance with a first embodiment of the present invention.

Referring initially to FIG. 1, a spinning reel in accordance with a first embodiment of the present invention is furnished with: a reel unit 2 that is attachable to a fishing rod; a handle assembly 1 rotatably fitted around a left-right shaft in the reel unit 2; a rotor 3; and a spool 4. The rotor 3 rotates in response to rotation of the handle assembly 1 to guide fishing line onto the spool 4. The rotor 3 is rotatable around a front-to-rear spool shaft supported on the front of the reel unit 2. The spool 4 winds fishing line guided by the rotor 3 onto its outer circumferential surface, and is disposed on the front side of the rotor 3 so as to be able to reciprocate in the front-rear axial direction.

Reel Unit Configuration

Figure 3:
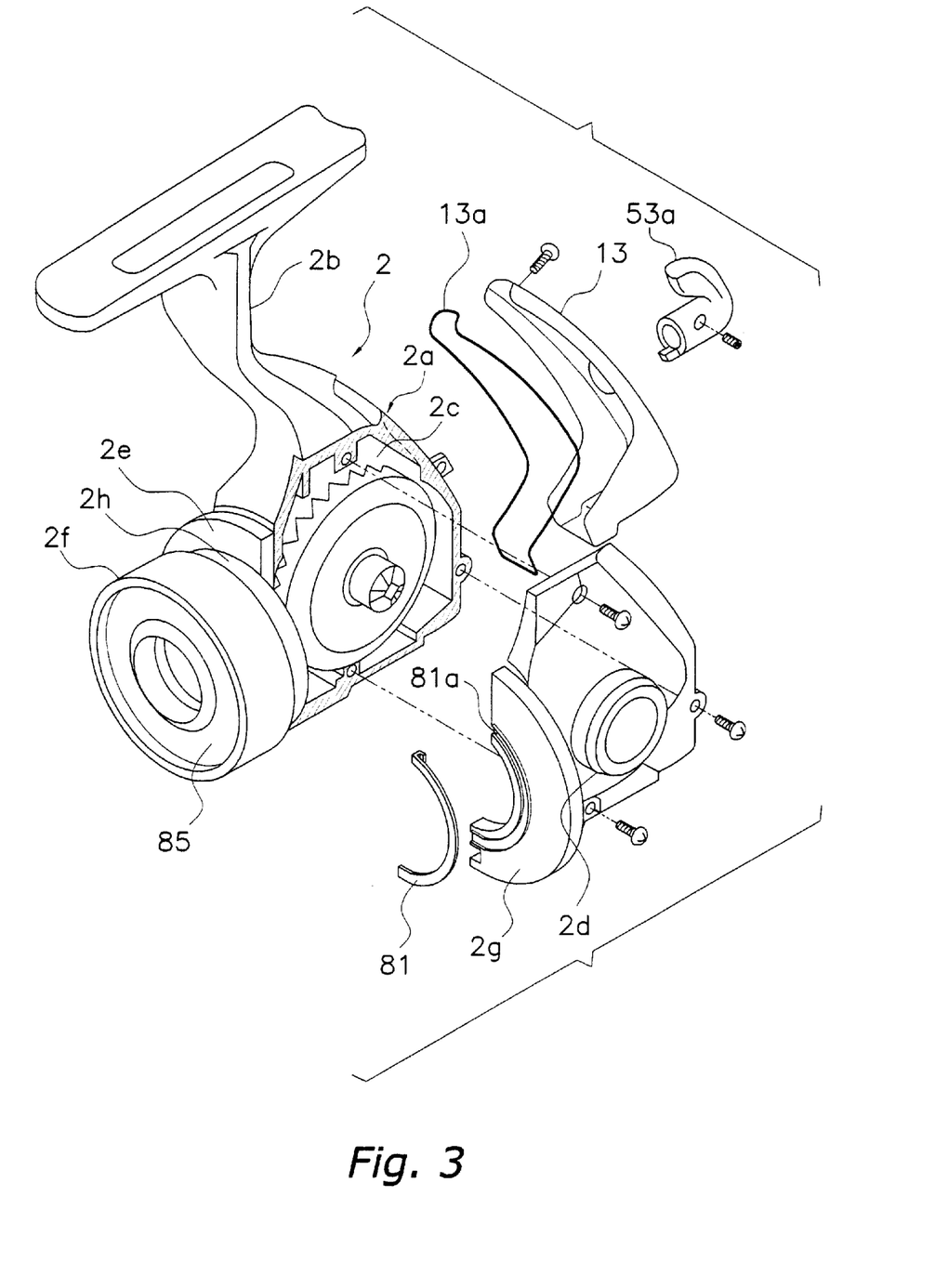
FIG. 3 is an exploded perspective view of the reel unit in accordance with a first embodiment of the present invention.

The reel unit 2 shown in FIG. 3 includes: a reel body 2a composing the chief part of the reel unit 2 and having a lateral aperture 2c; a T-shaped rod-mounting leg 2b extending diagonally up/frontward from and integrally with the reel body 2a; and a cover member 2d screwed fast to the reel body 2a so as to close the aperture 2c.

Figure 2:
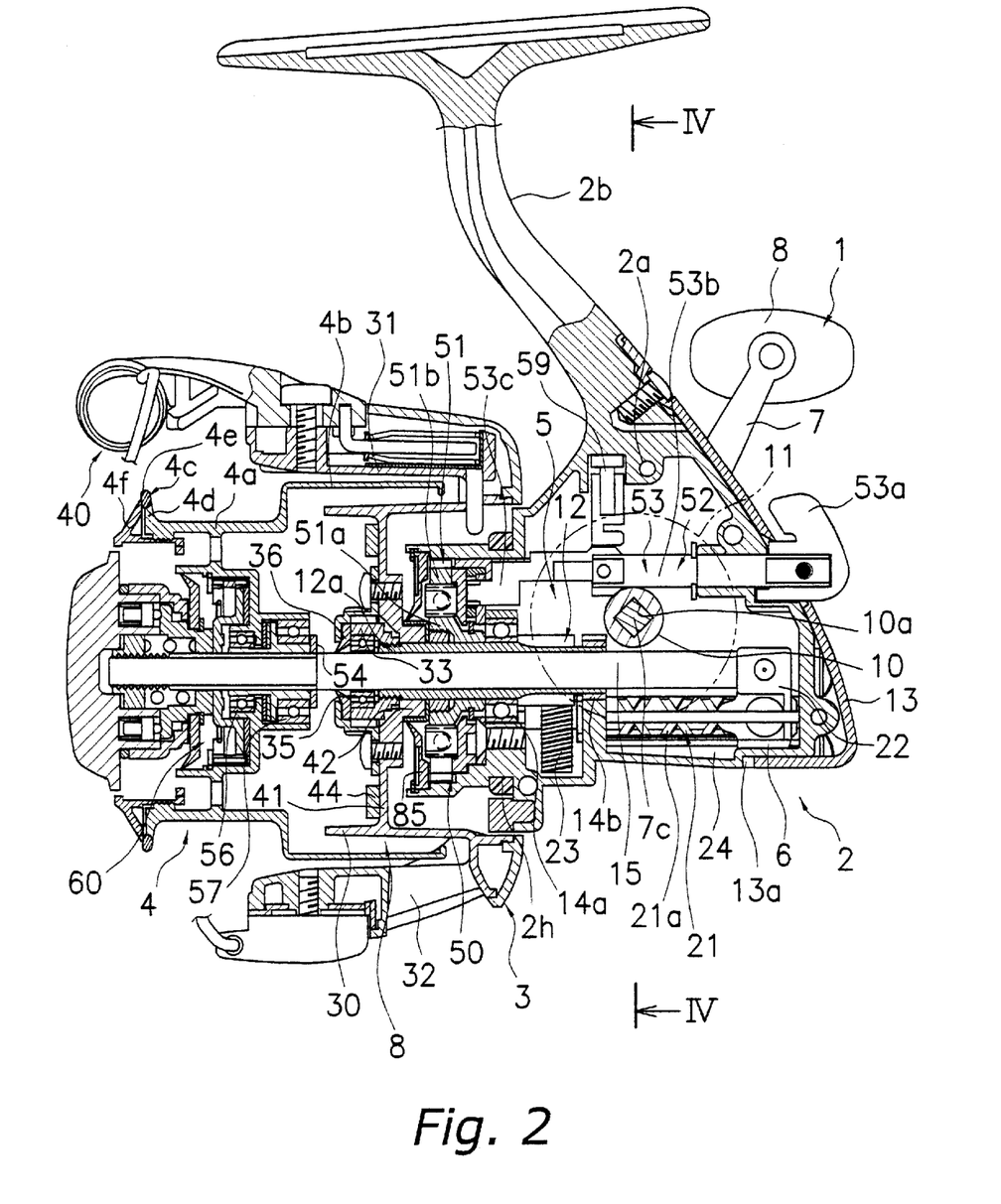
FIG. 2 is a left-side cross-sectional view of the spinning reel in accordance with a first embodiment of the present invention.

The reel body 2 has a mechanism-mounting space that opens to the aperture 2c. Installed within the space are, as shown in FIG. 2: a rotor-drive mechanism 5 that rotates the rotor 3 by linkage to rotation of the handle assembly 1; and an oscillating mechanism 6 that reciprocating the spool 4 in the front and rear directions to wind fishing line onto the spool 4 uniformly.

As shown in FIG. 3, a first flange portion 2e and a tubular portion 2f projecting forward from the first flange portion 2e are formed on the front of the reel body 2a. The first flange portion 2e has an approximately semicircular contour with a section formed by a chord and a circular arc being taken away. The first flange portion 2e is formed continuously with the front end of the aperture 2c. The tubular portion 2f is a cylindrical section. As shown in FIG. 2, a one-way clutch 51 of an anti-reverse mechanism 50 is unrotatably mounted in the interior of the tubular portion 2f for restricting and allowing reverse rotation of the rotor 3 in the line reel-out direction. A channel portion 2h, which is D-shaped when viewed in cross-section, is formed on the rear end of the tubular portion 2f. The channel portion 2h has a slightly smaller diameter than that of the tubular portion 2f. The area of the rear face of the channel portion 2h where the cover member 2d is to be attached is connected with the aperture 2c.

A second flange portion 2g is approximately shaped into the semicircular contour formed by the chord and circular arc that is missing from the first flange potion 2e. The second flange portion 2g is formed at the front end of the cover member 2d. A waterproofing seal 81 made from an elastic body is coupled to the second flange 2g so as to be fitted in between the opposing surfaces of the second flange portion 2g and the first flange portion 2e, and between the rear surface of the tubular portion 2f and the second flange portion 2g, for sealing the gaps therebetween. The waterproofing seal 81 is formed into a band shaped in an approximately semicircular arc. The waterproofing seal 81 is formed continuously from the front surface of the second flange 2g to its rear surface, covering a surface of the second flange 2g that opposes both the first flange portion 2e and the rear surface of the channel portion 2h. The waterproofing seal 81 is fitted into an approximately semicircular arcuate mounting groove 81 a formed on the front surface of the second flange portion 2g.

Figure 4:
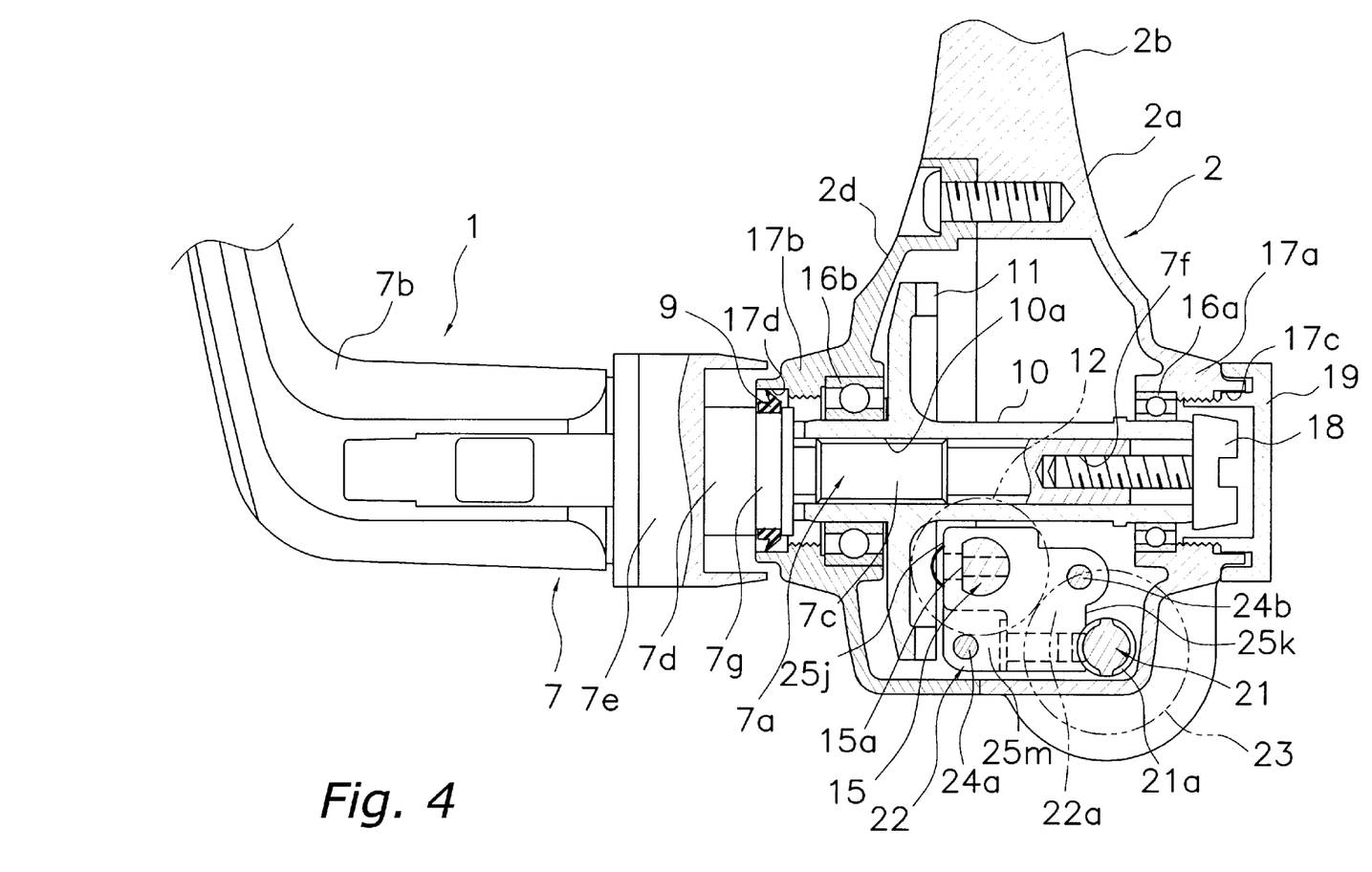
FIG. 4 is a cross-sectional view of the reel unit in accordance with a first embodiment of the present invention viewed at IV—IV of FIG. 2.

As shown in FIG. 4, a tubular boss portion 17a is formed in the right flank of the reel body 2a. The boss portion 17a is formed jutting inward into and outward from the reel body 2a in order to accommodate a bearing 16a that supports the right end of a master gear shaft 10. A boss portion 17b is formed in a position on the cover member 2d opposing the boss 17a. The boss portion 17b is formed jutting inward into and outward from the reel body 2a in order to accommodate a bearing 16b that supports the left end of the master gear shaft 10. A waterproof cap 19 closes off the boss portion that is opposite the side in which the handle assembly 1 is mounted (boss portion 17a in FIG. 4). The waterproof cap 19 is a tubular cap having a base, and is fixedly coupled to either boss portion 17a or 17b by being threadedly coupled to its inner circumferential surface.

As shown in FIGS. 2 and 3, the rear of the reel unit 2 is covered by a protective cap 13 manufactured from a metal or a synthetic polymer. The protective cap 13 is disposed to cover the lower part and rear surface of the reel unit 2, extending from beneath the reel body 2a and the cover member 2d across the rear surface and further to the rod-mounting leg 2b. The protective cover 13 is detachably and reattachably fastened to the reel unit 2 by screws. A spacer 13a made of a synthetic polymer in inserted between the protective cover 13 and the reel unit 2. The spacer 13a is interposed to fill the gap between the protective cover 13 and the reel unit 2. By interposing a spacer 13a in this manner, even though the protective cover 13 is manufactured from a synthetic polymer, variations in the gap owing to discrepancies in its manufacture are absorbed.

Handle Assembly

The handle assembly 1 is a component that, as shown in FIG. 4, is detachably and reattachably fitted to the master gear shaft 10, and includes: a handle body 7, a grip portion 8 (see FIG. 2) mounted on the handle body 7, and a seal member 9 fitted onto the handle body 7. The handle assembly 1 is attachable to the reel unit 2 through either the right side (FIG. 2) or the left side (FIG. 1). The handle body 7 includes a mounting section 7a that is fitted non-rotatably, detachably and reattachably to the master gear shaft 10, and an arm portion 7b that extends from the fore end of the mounting section 7a in a direction intersecting with the master gear shaft 10.

The mounting section 7a includes: a handle shaft portion 7c, which is rectangular in cross section and engages an interlocking hole 10a that is also rectangular in cross section and is formed in the center of the master gear shaft 10; a flange portion 7d into which the handle shaft portion 7c is inserted and with which the handle shaft portion 7c is thereby formed unitarily; and a shaft-collar portion 7e that is screwed into the flange portion 7d. A threaded hole 7f is bored in the distal end of the handle shaft portion 7c. The handle body 7 is non-rotatably fastened to the master gear shaft 10 by screwing a fixing screw 18 into the threaded hole 7f from the side of the reel body 2a opposite the side through which the master gear shaft 10 is inserted. A seal-attachment portion 7g having an annular groove is formed in the flange portion 7d in a position opposing either an inner circumferential surface 17c of the boss portion 17a of the reel body 2a or an inner circumferential surface 17d of the boss portion 17b of the cover member 2d. The shaft-collar portion 7e is disposed so as to cover the handle shaft portion 7c from outside.

The arm 7b is collapsibly fitted to the fore end of the mounting portion 7a. The arm 7b is bent at a mid point, so as to extend in a direction that intersects the master gear shaft 10. A grip portion 8 is mounted onto an extended tip of the arm 7b.

The grip portion 8 includes a grip shaft (not illustrated) crimp-fastened to the fore end of the arm 7b, and a T-shaped grip rotatably mounted on the grip shaft.

The seal member 9, which is made of an elastic substance such as NBR, is for contacting the inner circumferential surface of the boss portion 17a or 17b to seal the clearance between the boss portion 17a or 17b and the mounting portion 7a. The seal member 9 is fitted detachably and reattachably to the seal-attachment portion 7g. By fitting this seal member 9, it is possible to prevent liquids from seeping into the bearing 16a or 16b.

Rotor-Drive Mechanism Configuration

As shown in FIG. 2, the rotor drive mechanism includes a master gear 11 into which the handle assembly 1 is non-rotatably fitted, and a pinion gear 12 that meshes with the master gear 11.

The master gear 11 is a face gear formed unitarily with a master-gear shaft 10. The master-gear shaft 10 is a hollow component made of stainless steel. The interlocking hole 10a is formed through the center of the master gear shaft 10. Either end of the master-gear shaft 10 is rotatably supported via the bearings 16a and 16b in the reel body 2a and the lid member 2d.

The pinion gear 12, which is a tubular component as shown in FIG. 2, is disposed extending in the front-to-rear direction, and is fitted rotatably in the reel body 2a. The front portion 12a of the pinion gear 12 passes through the center part of the rotor 3, and is fastened in the center part with the rotor by a nut 33. The pinion gear 12 is rotatably supported by the reel body 2a at the mid-portion and rear end in the axial direction via respective bearings 14a and 14b. A spool shaft 15 passes through the interior of the pinion gear 12. Along with meshing with the master gear 11, the pinion gear 12 also meshes with the oscillation mechanism 6.

Rotor Configuration

The rotor 3 includes a round cylinder portion 30 fastened to the pinion gear 12; first and second rotor arms 31 and 32 opposing each other and furnished sideways on the round cylinder portion 30; and a bail arm 40 that guides fishing line onto the spool 4. The round cylinder portion 30 and the two rotor arms 31, 32 are made of aluminum-alloy, and are formed as a one-piece unitary member.

As shown in FIG. 2, a front wall 41 is formed on the front of the round cylinder portion 30. A rearward-projecting boss 42 is formed in the center portion of the front wall 41. A through-hole into which the pinion gear 12 is non-rotatably interlocked is formed in the center of the boss 42. The front portion 12a of the pinion gear 12 and the spool shaft 15 penetrate the through-hole. An inertia-imparting ring 44 for imparting inertia to the rotor 3 is detachably and reattachably mounted on the front face of the front wall 41 by screws (not illustrated). The inertia-imparting ring 44 is furnished in order to modulate the change in rotational feel attendant on lightening the weight of the rotor 3.

The nut 33 is screwed onto the front portion 12a of the pinion gear 12, and thus the rotor 3 is fastened non-rotatably to the fore end of the pinion gear 12 by the nut 33. A bearing 35 is disposed along the inner periphery of the nut 33. The bearing 35 is furnished to secure the clearance between the spool shaft 15 and the inner surface of the pinion gear 12. A seal element 36 having a lip along its inner periphery is fitted onto the front face of the nut 33 and the bearing 35. The distal edge of the seal element 36 contacts the spool shaft 15. This prevents liquids from permeating into the interior of the reel unit 2 from the spool shaft 15.

The aforementioned anti-reverse mechanism 50 is disposed neighboring the boss 42. As shown in FIG. 2, the anti-reverse mechanism 50 includes the one-way clutch 51 and a switching mechanism 52 that switches the one-way clutch 51 between an actuated state (reverse-prohibited state) and a non-actuated state (reverse-permitted state).

The one-way clutch 51 is a roller-type one-way clutch whose inner race is freely rotatable. The inner race 51a of the one-way clutch 51 is fitted non-rotatably to the pinion gear 12, while the outer race 51b is fitted non-rotatably to the tubular portion 2f. In the tubular portion 2f interior, a shaft seal 85 having a lip is fitted frontward of the one-way clutch 51.

The switching mechanism 52 has a stopper shaft 53. The stopper shaft 53 is mounted on the reel body 2a pivotably between a non-operational posture and an operational posture. The stopper shaft 53 includes: a stopper knob 53a that passes through and projects rearward from the reel body 2a and the protective cap 13 to allow operation; a shaft portion 53b fixedly coupled to the stopper knob 53a; and a cam 53c fixedly coupled to the tip of the shaft 53b.

Oscillating Mechanism Configuration

Figure 5:
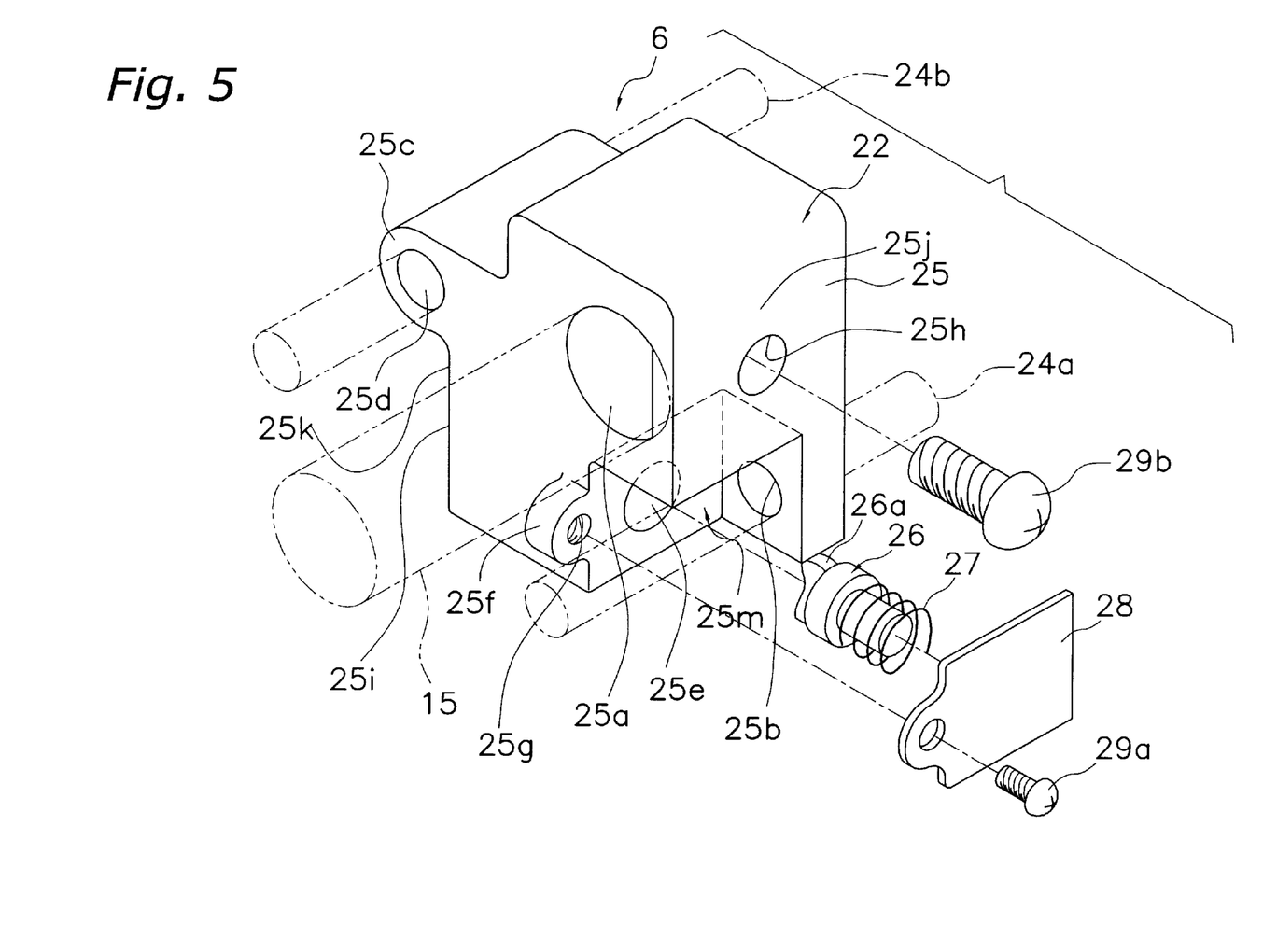
FIG. 5 is an exploded perspective view of the slider in accordance with a first embodiment of the present invention.

The oscillating mechanism or reciprocating mechanism 6 as shown in FIGS. 2, 4 and 5, is a device for reciprocating the spool shaft 15 in the front-to-rear directions in order to reciprocate the spool 4 in the same directions. Here, the spool shaft 15 is coupled to the mid-portion of the spool 4 via a drag mechanism 60.

The oscillating mechanism 6 includes a worm 21 disposed diagonally beneath and paralleling the spool shaft 15; an intermediate gear 23 for transmitting rotation of the rotor 3 to the worm 21; a slider (one example of a sliding member) 22 coupled non-rotatably and axially immovably to the hind end of the spool shaft 15; and two guide shafts 24a and 24b that guide the slider 22 in the direction of the spool shaft 15.

Crisscrossing helical grooves 21a are formed on the outer circumference of the worm 21, which is rotatably supported by the reel body 2a. The lead angle θ of the helical grooves 21a is set to 20° to 45°. Here, the "lead angle θ" of the helical grooves 21a is the angular measure expressed by:

Lead angle θ=arccot(πD/L)

wherein D is the bottom diameter of the helical grooves 21a, and the lead L is the length by which the worm 21 advances axially with one rotation. If the lead angle θ is smaller than 20°, the thickness of portions in between the helical grooves 21a will be unsatisfactorily thin, and at the same time the number of groove intersections will undesirably increase. On the other hand, if the lead angle θ exceeds 45°, the efficiency with which rotational movement is converted into linear movement decreases, which is also undesirable.

The slider 22 has a slider body 25 that is substantially a rectangular solid in conformation, and an engagement pin (one example of an engagement member) 26 mounted pivotably and axially movably on the slider body 25. As shown in FIGS. 4 and 5, the slider body 25 has a first side surface 25j and a second side surface 25k that are parallel to the worm 21. The second side surface 25k is disposed closer to the worm 21. The first side surface 25j is opposite the second side surface 25k.

The slider body 25 is fixed non-rotatably, axially immovably with respect to the spool shaft 15, and meanwhile is slidably fitted onto the two guide shafts 24a and 24b. A portion of the spool shaft 15 that is coupled with the slider body 25 is formed as a cut-off part 15a (see FIG. 4), making a section of the outer periphery flat. A fastening hole 25a for non-rotatably and axially immovably fixing the spool shaft 15 is formed penetrating the slider body 25 in the spool-shaft direction.

The front-left corner portion of the first side surface 25k of the slider body 25 is extensively gouged out into a rectangular contour to form a gouged-out portion 25m. A first guide hole (first guide mounting portion) 25b, through which the first guide member 24a is inserted, is formed in the remaining part of the slider body 25 to be parallel with the worm 21. As clearly shown in FIG. 5, the first guide member 24a passes through the gouged-out portion 25m. Formed on the right-side portion of the slider body 25 is a protrusion 25c in which a second guide hole (second guide mounting portion) 25d, through which the second guide member 24b is inserted, is formed to be parallel with the worm 21. The first guide hole 25b is formed in a position a bit lowered relative to the fastening hole 25a. The part underneath the protrusion 25c is an opposing portion 25i that opposes a portion of the outer circumference of the worm 21.

Furthermore, a mounting hole 25e is formed in the rectangularly gouged-out portion 25m of the slider body 25 so as to be orthogonal to the worm 21. The mounting hole 25e is formed for pivotably mounting the engagement pin 26 that extends from the radially outer side of the worm 21 toward the helical grooves. This mounting hole 25e is formed in a position that is substantially at the same height as the guide hole 25b. The engagement pin 26 is fitted pivotably and axially shiftably in the mounting hole 25e. The engagement pin 26 is urged toward the worm 21 by a coil spring or urging member 27. A cover member 28 closes off the mounting hole 25e. The cover member 28, a plate-shaped component, is fastened to the slider body 25 by a screw 29a. The screw 29a is screwed into a threaded hole 25g formed in a protrusion 25f jutting from the front of the slider body 25.

Furthermore, an anchoring hole 25h is formed in the slider body 25 through its left side face as shown in FIG. 5. A screw 29b that screws into a threaded hole (not illustrated) formed in the spool shaft 15 is inserted through the anchoring hole 25h. The spool shaft 15 is thereby fastened to the slider body 25.

An engager portion 26a that meshes with the helical grooves 21a in the worm 21 is formed at the end of the engagement pin 26. Accordingly, when the worm 21 rotates, the slider body 25 is shuttled back and forth.

The intermediate gear 23 is fastened non-rotatably to the fore end of the worm 21. The intermediate gear 23 meshes with the pinion gear 12 and rotates synchronously with the rotor 3 that is turned by cranking the handle assembly 1. The intermediate gear 23 gears down at the ratio of 1:2.5, and transmits rotation of the pinion gear 12 to the worm 21. Accordingly, the intermediate gear 23 has a larger outside diameter than that of a conventional one to achieve a larger gear-down ratio than that of a conventional one.

The first guide shaft 24a is fastened at either end to the reel body 2a, and as described earlier is inserted through the first guide hole 25b. Therefore, the first guide shaft 24a is disposed on a side of the base end of the engagement pin 26 opposite the side closer to the worm 21.

The second guide shaft 24b is fastened at either end to the reel body 2a, and as described earlier is inserted through the second guide hole 25d. The second guide shaft 24b is thereby disposed above the worm 21.

Herein, because the first guide shaft 24a and the second guide shaft 24b are disposed on different sides of the engagement pin 26, as opposed to above and below the worm 21 as has been the case with a conventional spool, there is no need to dispose a guide shaft underneath the worm 21. Accordingly, there is no need to secure a space for to accommodate guide shaft underneath the worm 21. As a result, it is possible to reduce the size of the reel unit 2.

Spool Configuration

The spool 4 has, as shown in FIG. 2, a shallow-channel contour, and is disposed between the first rotor arm 31 and the second rotor arm 32 of the rotor 3. The spool 4 is linked to the fore end of the spool shaft 15 via the drag mechanism 60. The spool 4 includes a bobbin trunk 4a circumferentially onto which fishing line is wound; a skirt 4b that is integrally formed on the rear end of the bobbin trunk 4a; and a front flange 4c established on the front end of the bobbin trunk 4a.

The bobbin trunk 4a is a roughly double-tiered cylindrical component having a boss in the center. The outer peripheral surfaces on the encompassing cylindrical sections are configured as circumferential surfaces parallel with the spool shaft 15. The bobbin trunk 4a is, as shown in FIG. 2, rotatably mounted on the spool shaft 15 by means of two bearings 56 and 57 fitted in the boss. The skirt 4b, which is a cylindrical component having a base, flares diametrically from the rear end portion of the bobbin trunk 4a, then extends rearward. The flange 4c includes: an integrally formed rise portion 4d diametrically outward from the front end portion of the bobbin trunk 4a; and a ring 4e made of metal or ceramic and detachably and reattachably mounted onto the rise portion 4d. A flange-fastening member 4f screwed into the inner peripheral surface of the bobbin trunk 4a fastens the ring 4e to the rise portion 4d.

A locating washer 54 fitted onto the spool shaft 15 abuts on and positions the spool 4.

Reel Handling and Operation

With this spinning reel, when the line is to be reeled out during casting, the bail arm 40 is flipped over into the line-releasing posture. Consequently, the fishing line is reeled out successively from the leading-edge side of the spool 4 by the terminal tackle under its own weight.

During line retrieval, the bail arm 40 is returned into the line-retrieving posture. This automatically takes place by the operation of a not-illustrated bail-flipping mechanism when the handle assembly 1 is rotated in the line-retrieving direction. The torque from the handle assembly 1 is transmitted to the pinion gear 12 via the master-gear shaft 10 and the master gear 11. The torque transmitted to the pinion gear 12 is transmitted from its front portion 12a to the rotor 3, and meanwhile to the worm 21 by the intermediate gear 23. Consequently, the slider 22 shuttles back and forth, and along with the rotor 3 rotating in the line-retrieving direction, the spool 4 reciprocates back and forth. At this time, since the slider 22 is guided by the two guide shafts 24a and 24b, the slider 22 moves smoothly back and forth. Furthermore, because the first guide shaft 24a is disposed on the side of the base end of the engagement pin 26, there is no need for a space beneath the worm 21. Accordingly, it is possible to reduce the vertical dimension of the reel body 2a and the size of the reel unit 2.

Other Embodiments

Embodiment of the spinning reel of the present invention are not limited to the foregoing embodiment; the present invention may be applied to any types of spinning reels, such as rear-drag type spinning reels in which the spool shaft rotates with respect to the slider; fixed-handle type spinning reels in which the handle is fixed on either the left or right side; or lever-brake type spinning reels in which the rotor is braked with a lever.

In the present invention, the worm is disposed diagonally beneath the spool shaft, while the first guide member is disposed on a side of the engagement member opposite the side closer to the worm. Accordingly, there is no need for a space to accommodate a guide member beneath the worm, since the guide shaft needs not be situated there. As a result, it is possible to reduce the size of the reel unit.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2001-276216. The entire disclosure of Japanese Patent Application No. 2001-276216 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A reciprocating mechanism for use in a spinning reel, said reciprocating mechanism being for reciprocating a spool in response to rotation of a rotor, the rotor being rotatable via a pinion gear in response to rotation of a handle assembly, the spool being coupled to a spool shaft that is mounted on a reel unit so as to be shiftable in a front-rear direction, said reciprocating mechanism comprising:

a worm rotatably supported by the reel unit and disposed diagonally beneath and paralleling the spool shaft, said worm having crisscrossing helical grooves formed on its outer circumference;

a sliding member having an engagement member and a slider body, said engagement member being for engaging said helical grooves, said slider body having first and second side surfaces that are parallel to said worm, said second side surface being closer to said worm and said first side surface being opposite said second side surface, said slider body further having a gouged-out portion formed on said first side surface and a mounting portion formed in a said gouged-out portion for pivotably supporting said engagement member such that said engagement member engages said helical grooves of said worm, said sliding member being coupled to the spool shaft axially immovably;

a. rotation-transmitting part for transmitting rotation of the rotor to said worm;

a first guide member disposed so as to pass through said gouged-out portion, said first guide member being for guiding said sliding member in a direction along the spool shaft; and a second guide member disposed above said worm for guiding said sliding member in the direction along the spool shaft.

2. The reciprocating mechanism as set forth in claim 1, wherein said sliding member includes an opposing portion that opposes only a portion of said outer circumference of said worm.

3. The reciprocating mechanism as set forth in claim 1, wherein said rotation-transmitting part has an intermediate gear, said intermediate gear meshing with the pinion gear and being fitted immovably to said worm.

4. The reciprocating mechanism as set forth in claim 1, wherein said slider body has first and second guide mounting portions for slidably mounting said first and second guide members respectively.

5. The reciprocating mechanism as set forth in claim 4, wherein said mounting portion is formed at substantially the same height as said first guide mounting portion, and said second guide mounting portion is formed above said mounting portion.

6. The reciprocating mechanism as set forth in claim 4, wherein said gouged-out portion is rectangularly shaped and said first guide mounting portion is formed in said gouged-out portion of said slider body.

7. The reciprocating mechanism as set forth in claim 1, wherein said mounting portion includes a mounting hole to which said engagement member pivotably couples.

8. The reciprocating mechanism as set forth in claim 7, wherein said mounting portion further includes a cover member and an urging member that is disposed between said engagement member and said cover member such that said urging member urges said engagement member toward said helical grooves.

9. A spinning reel for use with a fishing rod, comprising:

a reel unit attachable to the fishing rod and having a reciprocating mechanism;

a handle assembly rotatably fitted to said reel unit;

a rotor rotatable in response to rotation of said handle assembly around a spool shaft supported by said reel unit; and a spool disposed on a front side of said rotor for winding fishing line guided by said rotor onto an outer circumference of said spool, said reciprocating mechanism being for reciprocating said spool in front and rear directions and including a worm rotatably supported by said reel unit and disposed diagonally beneath and paralleling said spool shaft, said worm having crisscrossing helical grooves formed on its outer circumference;

a sliding member having an engagement member and a slider body, said engagement member being for engaging said helical grooves, said slider body first and second side surfaces that are parallel to said worm, said second side surface being closer to said worm and said first side surface being opposite said second side surface, said slider body further having a gouged-out portion formed on said first side surface and a mounting portion formed in said gouged-out potion for pivotably supporting said engagement member such that said engagement member engages said helical grooves of said worm, said sliding member being coupled to said spool shaft axially immovably;

a rotation-transmitting part for transmitting rotation of said rotor to said worm;

a first guide member disposed so as to pass through said gouged-out portion said first guide member being for guiding said sliding member in a direction along said spool shaft; and a second guide member disposed above said worm for guiding said sliding member in the direction along said spool shaft.

10. The reciprocating mechanism as set forth in claim 9, wherein said sliding member includes an opposing portion that opposes only a portion of said outer circumference of said worm.

11. The reciprocating mechanism as set forth in claim 9, wherein said reel unit includes a pinion gear that rotates said rotor in response to cranking of said handle assembly, and said rotation-transmitting part has an intermediate gear, said intermediate gear meshing with the pinion gear and being fitted immovably to said worm.

12. The reciprocating mechanism as set forth in claim 9, wherein said slider body has first and second guide mounting portions for slidably mounting said first and second guide members respectively.

13. The reciprocating mechanism as set forth in claim 12, wherein said mounting portion is formed at substantially the same height as said first guide mounting portion, and said second guide mounting portion is formed above said mounting portion.

14. The reciprocating mechanism as set forth in claim 12, wherein said gouged-out portion is rectangularly shaped, and said first guide mounting portion is formed in said gouged-out portion of said sliding member.

15. The reciprocating mechanism as set forth in claim 9, wherein said mounting portion includes a mounting hole to which said engagement member pivotably couples.

16. The reciprocating mechanism as set forth in claim 15, wherein said mounting portion further includes a cover member and an urging member that is disposed between said engagement member and said cover member such that said urging member urges said engagement member toward said helical grooves.

\* \* \* \* \*